United States Patent
Mick et al.

(10) Patent No.: US 8,655,162 B2
(45) Date of Patent: Feb. 18, 2014

(54) LENS POSITION BASED ON FOCUS SCORES OF OBJECTS

(75) Inventors: John Mick, Fort Collins, CO (US); Shane D Voss, Fort Collins, CO (US); Jason Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 13/435,820

(22) Filed: Mar. 30, 2012

(65) Prior Publication Data

US 2013/0259459 A1    Oct. 3, 2013

(51) Int. Cl.
*G03B 3/10* (2006.01)
*G03B 13/00* (2006.01)

(52) U.S. Cl.
USPC ........... 396/121; 396/345; 396/123; 348/345; 348/355

(58) Field of Classification Search
USPC ............. 396/89, 121, 123; 348/355, 363, 345
See application file for complete search history.

(56) References Cited

U.S. PATENT DOCUMENTS

| | | | |
|---|---|---|---|
| 6,614,998 B1 | 9/2003 | Senba et al. | |
| 7,391,461 B2 * | 6/2008 | Ogino | 348/345 |
| 7,630,148 B1 | 12/2009 | Yang et al. | |
| 8,018,524 B2 * | 9/2011 | Kawarada | 396/123 |
| 2004/0100573 A1 * | 5/2004 | Nonaka | 348/345 |
| 2011/0267508 A1 | 11/2011 | Kane et al. | |

FOREIGN PATENT DOCUMENTS

| WO | WO-2010081556 | 7/2010 |
|---|---|---|
| WO | WO-2011101035 | 8/2011 |

* cited by examiner

*Primary Examiner* — Christopher Mahoney
(74) *Attorney, Agent, or Firm* — Neel Patel (57) ABSTRACT

Embodiments herein relate to setting a lens position based on focus scores. A plurality of initial positions of a lens are determined. Each of the initial positions may correspond to a position of the lens at which one of a plurality of objects has a highest quality. A focus score may be determined at each of the initial positions for the corresponding object having the highest quality. A final position of the lens between two of the initial positions may be calculated based on the focus scores.

14 Claims, 4 Drawing Sheets

LENS POSITION BASED ON FOCUS SCORES OF OBJECTS

BACKGROUND

Devices that capture images, such as cameras, seek to focus the image before capturing the image. Such devices often employ autofocus systems that focus on a single object of the image. However, the user may wish to focus on multiple objects of the image.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A device to capture images, such as a camera, may include a lens system, a focus scoring system, and an aperture control system. The lens system may include a lens and mechanical parts for moving the lens to different positions along a horizontal axis.

The focus scoring system may be a simple system used to determine a focus of the image during different positions of the lens. An example of the simple system may include a passive autofocus system which determines the focus by analyzing the image alone during the different lens positions, such as by using phase detection or contrast measurement. Thus, the passive autofocus system, unlike an active autofocus system, does not generally emit any type of energy, such as ultrasonic sound or infrared light waves, to measure a distance to the object from the device. The term object may refer to any point of interest in a scene to be captured, such as a person, landscape, etc.

The aperture control system may determine a size of the aperture as well as a time the aperture is to remain exposed, e.g., a time a shutter remains opens. The aperture may be a hole or an opening through which light travels. For example, incident light depicting the scene may enter through the lens to a sensor to capture the image. The lens may be either in front of the aperture and/or between the sensor and the aperture. A mechanism may adjust the aperture size while the shutter may cover or expose the aperture according to an exposure time. The aperture size and a depth of field are inversely related. The depth of field may define an area between the nearest and farthest distances of the scene that appear acceptably sharp in the image.

For example, a smaller aperture size, e.g. a larger f-number, will result in a larger depth of field while a larger aperture size, e.g. a smaller f-number, will result in a smaller depth of field. However, using the smaller aperture size will also result in less light passing through the aperture and thus longer exposure times. Hence, while the larger depth of field may allow more objects to be in focus, the overall image may be of a lower quality. For example, the objects in a larger depth of field may have a lower resolution than the objects in a smaller depth of field due to greater camera or hand shake and/or object movement that can occur during the longer exposure times needed for the larger depth of field. The term resolution may describe an ability of the lens system to resolve detail in the object that is to be captured.

Together, the lens, focus scoring and aperture control system may be used to determine a lens position and aperture size for an optimal focus of the object of the image to be captured. However, as explained above, the focus scoring system may be a simple system that lacks a depth detection mechanism, and therefore cannot make an intelligent decision about which of the objects is closer or more important. For instance, a first object of the multiple objects may have a higher focus score, such as by having a higher contrast ratio or color intensity, despite being farther away than a second object of the multiple objects. Thus, the device may focus on the first object even if the user sought to focus on a closer object, such as the second object. Conversely, if the second object has the higher focus score, such as by having greater sharpness, the device may focus on the second object even when the user finds a farther object, such as the first object, more important.

Further, the user may instead seek to capture multiple objects, such as both the first and second objects, in focus. However, as explained above, the focus scoring system may only determine the lens position at which one of the objects has the greatest focus. For example, the device may set the lens position to focus on the second object and set the aperture size to be large in order to have a narrow depth of field so that the second object will be sharp. However, as a result of the narrow depth of field, the first object will be largely out of focus. Choosing a smaller aperture size to increase the depth of field while maintaining the lens position to focus on the second object may also allow the second object to be in focus. However, the overall image quality may suffer, such as from blurriness, by choosing such a large depth of field. Thus, the user may be unable to capture multiple objects with sufficient focus and image quality.

Embodiments may allow for a plurality of objects to be in focus or within the depth of field while reducing or preventing a worsening in the image quality or sharpness of the image. For example, an embodiment may include a position module to determine a plurality of initial positions of a lens projecting an image. Each of the initial positions may correspond to a position of the lens at which one of a plurality of objects of the image projected through the lens has a highest quality. The embodiment may further include a scoring module to determine a focus score at each of the initial positions for the corresponding object having the highest quality. The focus score is a measurement of image quality. The embodiment may also include a calculation module to calculate a final position of the lens between two of the initial positions based on the focus scores.

Hence, by having the final position be between two of the initial positions, embodiments may minimize a size of the depth of field needed ahead of and behind the final position to encompass the plurality of objects. Therefore, shutter speed may be reduced, hence reducing or preventing the compromising of image quality. As a result, embodiments have a greater likelihood of capturing images that the user may desire, such as high quality images with multiple objects in focus.

Figure 1:
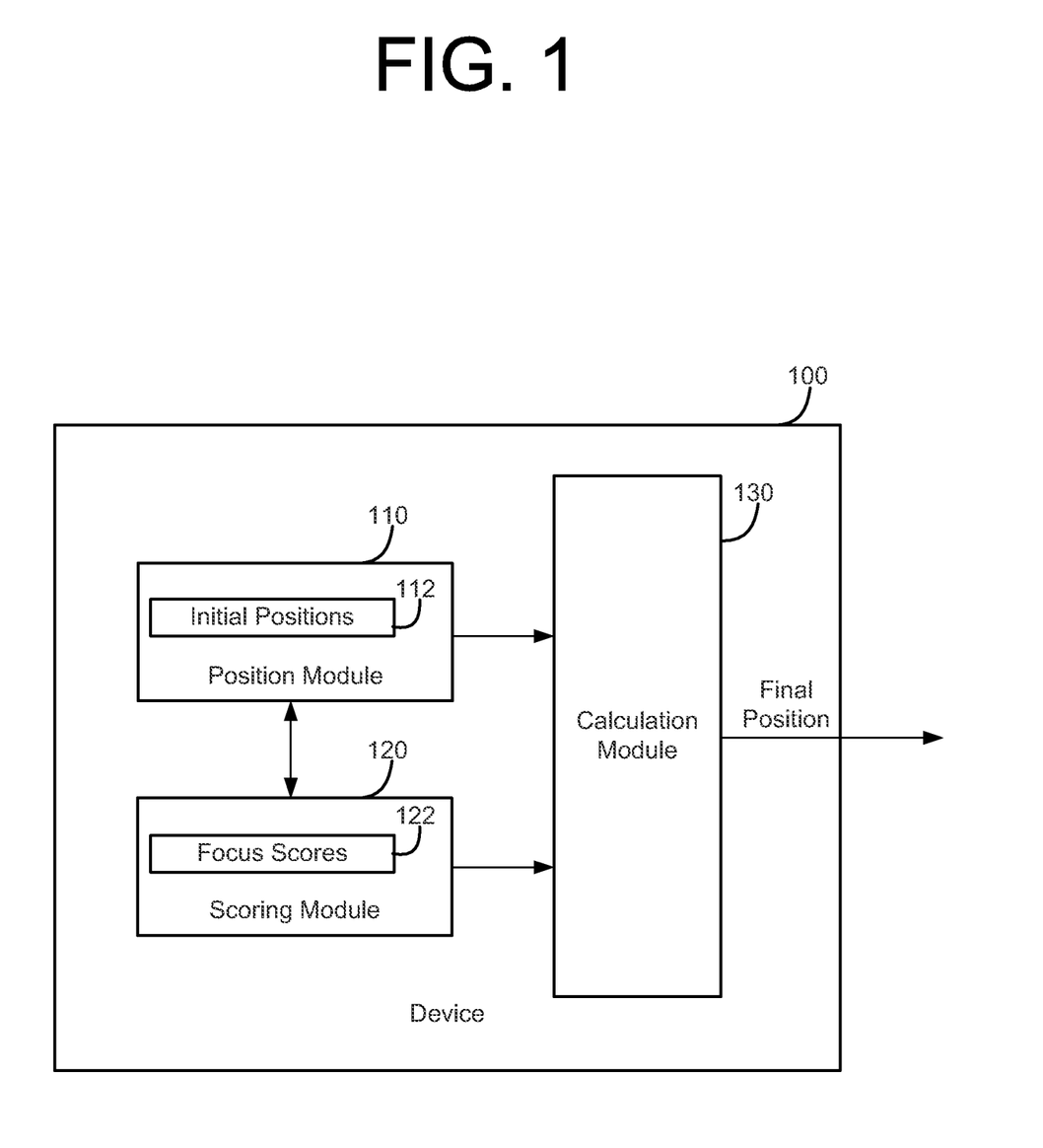
FIG. 1 is an example block diagram of a device for determining lens position based on focus scores.

Referring now to the drawings, FIG. 1 is an example block diagram of a device 100 for determining lens position based on focus scores. The device 100 may be included in any type of user device to process an image, such as a camera, a microprocessor, a computer, and the like. In the embodiment of FIG. 1, the device 100 includes a position module 110, a scoring module 120 and a calculation information 130.

The modules 110, 120 and 130 may include, for example, a hardware device including electronic circuitry for implementing the functionality described below, such as control logic and/or memory. In addition or as an alternative, the modules 110, 120 and 130 may be implemented as a series of instructions encoded on a machine-readable storage medium and executable by a processor.

The position module 110 is to determine a plurality of initial positions 112 of a lens (not shown) projecting an image. Each of the initial positions 112 is to correspond to a position of the lens at which one of a plurality of objects (not shown) of the image projected through the lens has a highest quality.

The scoring module 120 is to determine a focus score 122 at each of the initial positions 112 for the corresponding object having the highest quality. The focus score is to be a measurement of quality. For example, the focus score may be based on a passive autofocus system, such as contrast detection, color differential and/or edge detection of the object. The objects having higher contrast, greater color differential and/or more visibly defined edges may have higher focus scores.

The calculation module 130 is to calculate a final position of the lens between two of the initial positions based on the focus scores 122. The final position may be a position of the lens used to capture an image, such as a still picture taken by the camera.

The calculation module 130 is to select the final position to be between at least two of the initial positions 112 corresponding to the focus scores 122 having high values. For instance, assuming there are five objects with the focus scores 4, 6, 3, 7 and 2, the calculation module 130 may select the final position of the lens to be between the at least two initial positions 112 for the objects corresponding to the focus scores of 6 and 7.

In one embodiment, the calculation module 130 may set the final position of the lens to be a midpoint between the at least two initial positions 112. For example, if a change in the lens position between the at least two initial positions 112 is 1 millimeter (mm), the calculation module 130 may set the final position be 0.5 mm between the at least two initial positions 112.

In another embodiment, the calculation module 130 may set the final position of the lens to be based on a weighted average of the at least two initial positions, each of the at least two initial positions to be weighted by the corresponding focus score. For example, if the at least two initial positions 112 had corresponding focus scores of 5 and 10, the calculation module 130 may set the final position to be closer to the initial position corresponding to the focus score of 10 than the initial position corresponding to the focus score of 5. For instance, the final position may be 25% closer to the initial position corresponding to the focus score of 10 than the initial position corresponding to the focus score of 5.

In yet another embodiment, the calculation module 130 may calculate the final position based on a max number of the focus scores 122. For example, the max number may be 9, thus allowing the calculation module 130 to consider, at most, 9 focus scores in determining the final position. Thus, the calculation module 130 may exclude at least one of the focus scores 122 having the measurement lower than that of an other of the focus scores, if a number of the focus scores exceeds the max number. For example, if the max number is 9 and there are 10 focus scores, one of the focus scores, such as the lowest focus score, may be dropped by the calculation module 130 in determining the final position. The final position output by the device 100 may be received by the lens system to set the lens to the final position.

Figure 2:
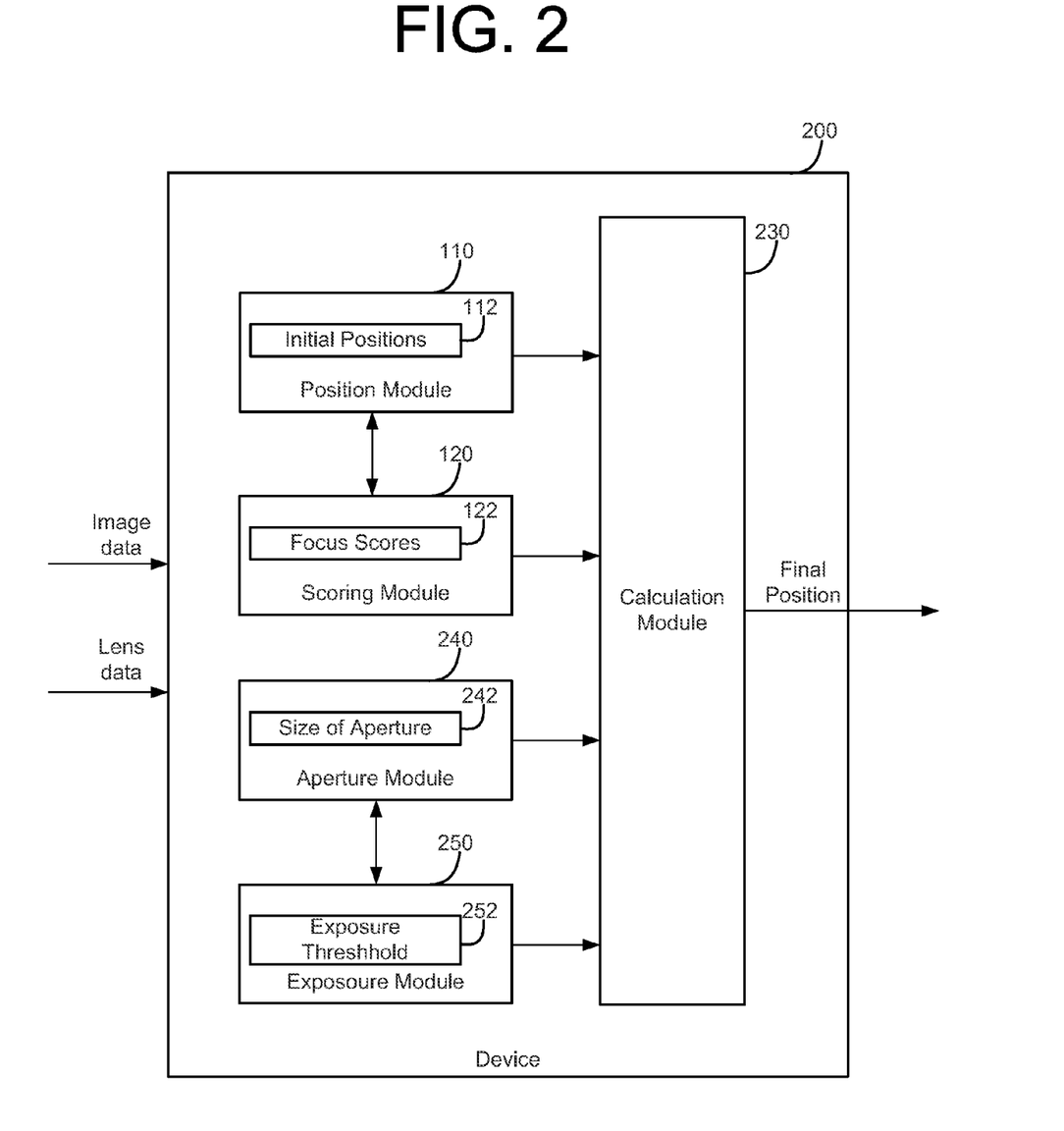
FIG. 2 is another example block diagram of a device for determining lens position based on focus scores.

FIG. 2 is another example block diagram of a device 200 for determining lens position based on focus scores. The device 200 may be included in any type of user device to process an image, such as a camera, a microprocessor, a computer, and the like. In the embodiment of FIG. 2, the device 200 includes the position module 110 of FIG. 1, the scoring module 120 of FIG. 1, a calculation module 230, an aperture module 240 and an exposure module 250. The calculation module 230 of FIG. 2 may include at least the functionality of the calculation module 130 of FIG. 1. Image data, such as from the sensor, may be received by the scoring module 120 to determine the focus scores and lens data, such as information about the lens position, may be received by the position module 110.

The aperture and exposure modules 240 and 250 may include, for example, a hardware device including electronic circuitry for implementing the functionality described below, such as control logic and/or memory. In addition or as an alternative, the aperture and exposure modules 240 and 250 may be implemented as a series of instructions encoded on a machine-readable storage medium and executable by a processor.

The aperture module 240 is to a select a size 242 of an aperture (not shown) over the lens to set the depth of field. Further, the aperture module 240 may select the size 242 of the aperture such that at least two of the plurality of objects around the final position calculated by the calculation module 230 are within the depth of field. In one embodiment, the aperture module 240 may select the size 242 of the aperture to maximize the plurality of objects within the depth of field around the final position.

The exposure module 250 is to determine an exposure threshold 252 based on at least one of a type of medium and sensor to capture the image. For example, films or sensors may have different films ISO settings. The exposure threshold 252 may determine a maximum time the aperture may remain exposed or open. The aperture module 240 is to select the size of the aperture such that an exposure time of the image is within the exposure threshold and such that exposure time is sufficient to capture the image adequately. The exposure time is to relate to a duration of time light is to pass through the aperture. As explained above, smaller aperture sizes require greater exposure times due to less light passing through the aperture.

The calculation module 230 is to further determine the final position based on the selected aperture size 242, where the aperture size 242 is to determine the depth of field in front of and behind the final position. An example of the relation between the plurality of objects included in the depth of the field and the final position is shown in greater detail below with respect to FIG. 3.

Also, it may not always be possible to include at least two of the plurality of objects having the highest focus scores within the depth of field, such as when these objects are too far apart. Thus, in one embodiment, the calculation module 230 may select the final position such that the depth of field includes at least the object corresponding to one of the highest focus scores and such that the depth of field is shifted towards an other of the objects corresponding to an other of the highest focus scores.

For example, assume there are four consecutive focus scores of 3, 9, 2, 8 and that centering the final position to be between the initial positions corresponding to the focus scores of 9 and 8 would result in neither of the objects corresponding to the focus scores of 9 and 8 being within the depth of field. In this case, the calculation module 230 may set the final position such that the depth of field includes the object corresponding to the focus score of 9 but is closer to the object corresponding the focus score of 8 than the object corresponding the focus score of 3. The objects corresponding to the focus scores of 8 and 3 would still not be in the depth of field, but the object corresponding to the focus score of 8 may appear sharper than if the depth of field was not shifted towards it.

In another embodiment, the calculation module 230 may determine the final distance based on a sum of the focus scores within the depth of field at various positions of the lens. For example, assume there are six consecutive focus scores of 9, 1, 8, 7, 6, 7 and the depth of field is large enough to include three of the focus scores. The calculation module 230 could set the final position to be between the two initial positions corresponding to the highest focus scores of 9 and 8. However, the sum of the focus scores within the depth of field would only be 18 (9+1+8). In this embodiment, the calculation 230 may determine that the highest sum of focus scores may be achieved by setting the final position to be between the two initial positions corresponding to the focus scores of 8 and 6. Thus, the sum of the scores would be 21 (8+7+6). In this case, capturing an image with a greater number of high focus score objects may be preferable to capturing an image with the highest focus score object.

Figure 3:
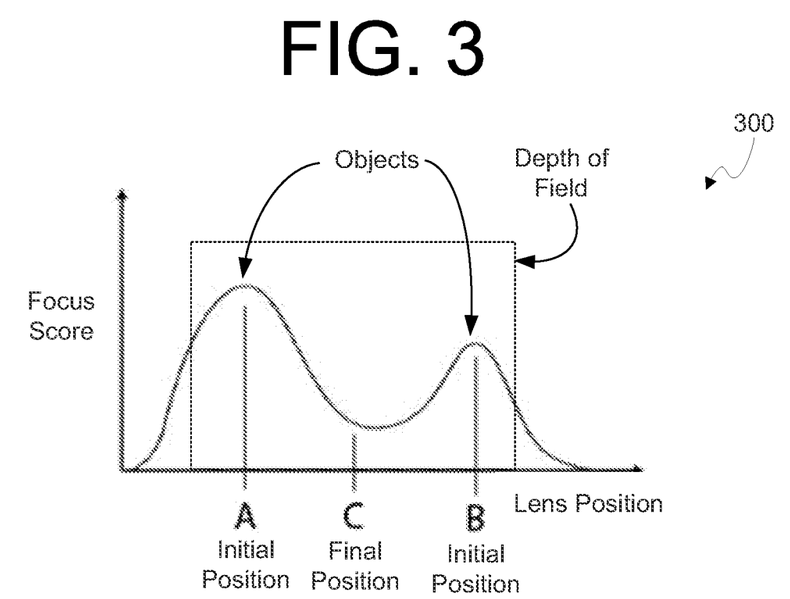
FIG. 3 is an example graph showing focus scores of objects.

FIG. 3 is an example graph 300 showing focus scores of objects. The results shown in the graph 300 may be implemented by either of the devices 100 and 200 of FIGS. 1 and 2. In the example graph of FIG. 3, a horizontal axis is shown to indicate the lens position and a vertical axis is shown to indicate the focus score. Initial positions A and B correspond to lens positions identifying objects having relatively high focus scores. A final position C is shown to be calculated to be between the initial positions A and B. Further, the depth of field is shown by the dotted rectangular shape surrounding the final position C and encompasses the initial positions A and B.

Hence, the calculation module 130 or 230 set the lens position to be between the two initial positions A and B, and the aperture module 240 set the aperture size such that the depth of field was large enough to include both objects corresponding to the two initial positions A and B. Yet the depth of field is not overly large. For instance, the depth of field does not extend unnecessarily in front of the initial position A or behind the initial position B. Thus, in the case, an image may be captured that has both of the objects at the initial positions A and B in focus while minimizing any loss in image quality from choosing a larger depth of field.

Figure 4:
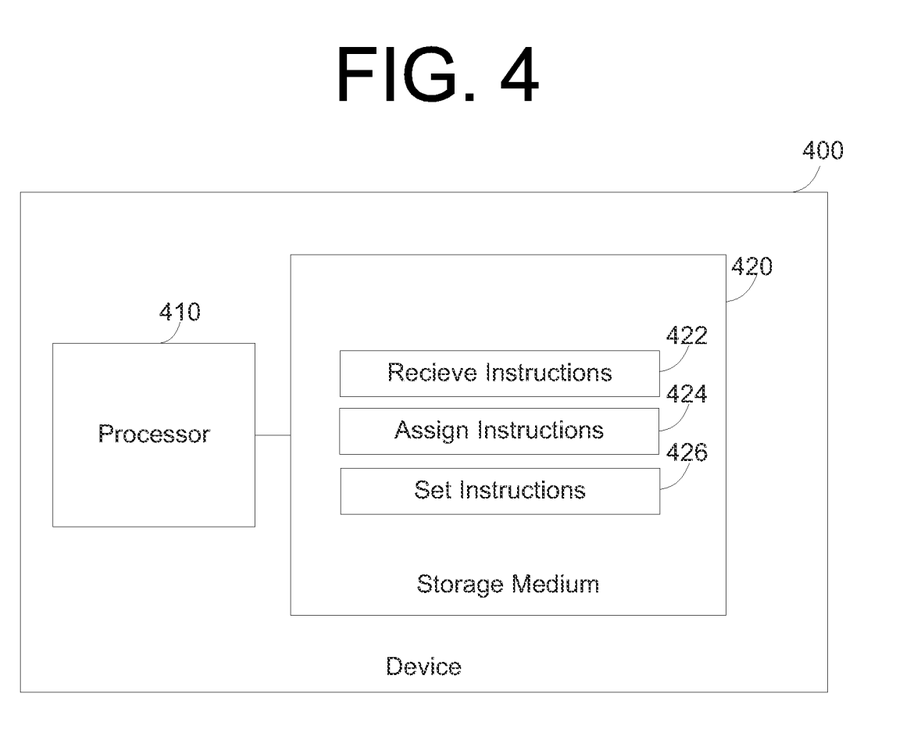
FIG. 4 is an example block diagram of a computing device including instructions for determining lens position based on focus scores.

FIG. 4 is an example block diagram of a computing device 400 including instructions for determining lens position based on focus scores. In the embodiment of FIG. 4, the computing device 400 includes a processor 410 and a machine-readable storage medium 420. The machine-readable storage medium 420 further includes instructions 422, 424 and 426 for determining lens position based on focus scores.

The computing device 400 may be, for example, a camera, a chip set, a notebook computer, a slate computing device, a portable reading device, a wireless email device, a mobile phone, or any other type of device capable of executing the instructions 422, 424 and 426. In certain examples, the computing device 400 may include or be connected to additional components such as memories, sensors, displays, lens, etc.

The processor 410 may be, at least one central processing unit (CPU), at least one semiconductor-based microprocessor, at least one graphics processing unit (GPU), other hardware devices suitable for retrieval and execution of instructions stored in the machine-readable storage medium 420, or combinations thereof. The processor 410 may fetch, decode, and execute instructions 422, 424 and 426 to implement determining lens position based on focus scores. As an alternative or in addition to retrieving and executing instructions, the processor 410 may include at least one integrated circuit (IC), other control logic, other electronic circuits, or combinations thereof that include a number of electronic components for performing the functionality of instructions 422, 424 and 426.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 420 may be encoded with a series of executable instructions for determining lens position based on focus scores.

Figure 5:
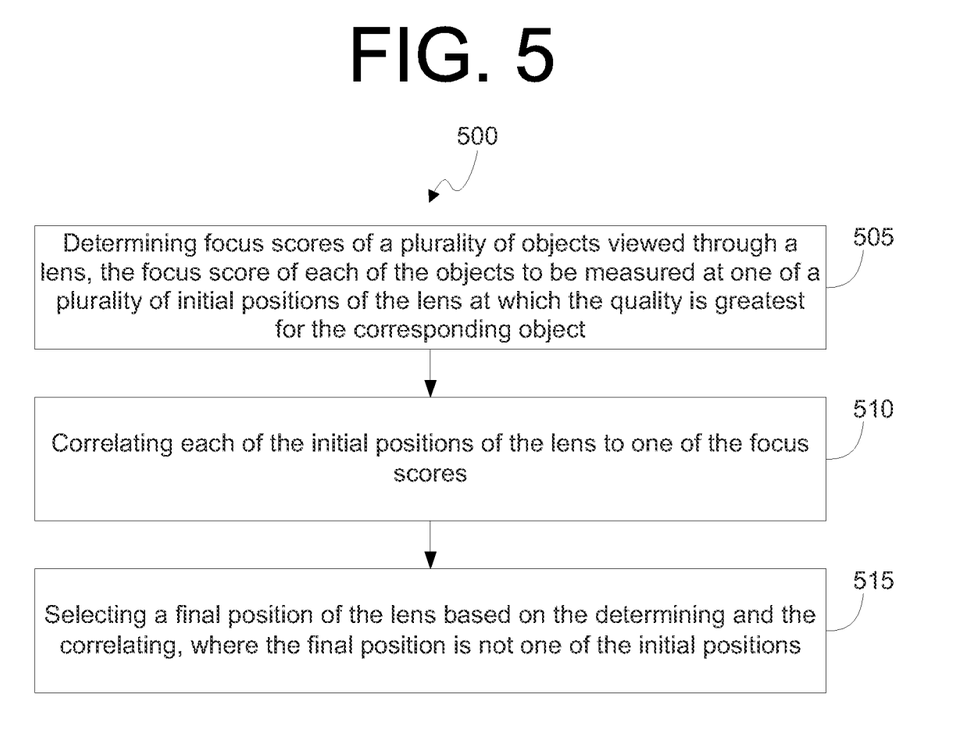
FIG. 5 is an example flowchart of a method for determining lens position based on focus scores.

Moreover, the instructions 422, 424 and 426 when executed by a processor (e.g., via one processing element or multiple processing elements of the processor) can cause the processor to perform processes, such as, the process of FIG. 5. For example, the receive instructions 422 may be executed by the processor 410 to receive image data to determine initial positions of a lens (not shown) at which each of a plurality of objects (not shown) of an image has a highest quality. The assign instructions 424 may be executed by the processor 410 to assign a focus score to each of the plurality of objects when each of the objects has the highest quality, the focus score to provide a quality measurement. The set instructions 426 may be executed by the processor 410 to set a final position of the lens to be between two of the initial position based on the focus scores, as further explained above with respect to FIGS. 1 and 2.

The machine-readable storage medium 420 may also include instructions (not shown) to set a size of an aperture of the lens based on an exposure setting, as further explained above with respect to FIGS. 1 and 2. The size of the aperture is to determine a depth of field and the final position of the lens is further set based on the depth of field.

FIG. 5 is an example flowchart 500 of a method for determining lens position based on focus scores. Although execution of the method 500 is described below with reference to the device 200, other suitable components for execution of the method 500 can be utilized, such as the device 100. Additionally, the components for executing the method 500 may be spread among multiple devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 505, the device 200 determines focus scores of a plurality of objects viewed through a lens. The focus score of each of the objects is to be measured at one of a plurality of initial positions of the lens at which the quality is greatest for the corresponding object. Then, at block 510, the device 200 correlates each of the initial positions of the lens to one of the focus scores. Then, at block 515, the device 200 selects a final position of the lens based on the determining at block 505 and the correlating at block 510. The final position may not be one of the initial positions. For example, at block 515, the device 200 may select the final position to be between two of the initial positions corresponding to the highest focus scores. Further, at block 515, the device 200 may select the final position based on a depth of field. The depth of field is to be centered around the final position and the depth of field is based on a size of an aperture of the lens.

According to the foregoing, embodiments provide a method and/or device for capturing a plurality of objects in focus while reducing or preventing a worsening in the image quality. For example, a final position of a lens may be set to be between two initial positions of the lens that correlate to a highest focus for two of the plurality of objects. Thus, a size of the depth of field may be minimized while still including the plurality of objects. As a result, embodiments have a greater likelihood of capturing images that the user may desire, such as high quality images with multiple objects in focus.

We claim:

1. A device comprising:
   a position module to determine a plurality of initial positions of a lens projecting an image, each of the initial positions to correspond to a position of the lens at which one of a plurality of objects of the image projected through the lens has a highest quality;
   a scoring module to determine a focus score at each of the initial positions for the corresponding object having the highest quality, the focus score to be a measurement of quality; and
   a calculation module to calculate a final position of the lens between two of the initial positions based on a max number of the focus scores,
   wherein the calculation module excludes at least one of the focus scores having a value lower than that of an other of the focus scores, if a number of the focus scores exceeds the max number.

2. The device of claim 1, wherein the calculation module is to select the final position to be between at least two of the initial positions corresponding to the focus scores having high values.

3. The device of claim 2, wherein the calculation module is to at least one of,
   set the final position of the lens to be a midpoint between the at least two initial positions, and
   set the final position of the lens to be based on a weighted average of the at least two initial positions, each of the at least two initial positions to be weighted by the corresponding focus score.

4. The device of claim 1, further comprising:
   an aperture module to a select a size of an aperture over the lens to set a depth of field, wherein
   the aperture module is to select the size of the aperture such that at least two of the plurality of objects around the final position calculated by the calculation module are within the depth of field.

5. The device of claim 4, wherein,
   the aperture module is to select the size of the aperture to maximize the plurality of objects within the depth of field around the final position, and
   the aperture module is to select the size of the aperture such that an exposure time of the image is within an exposure threshold, the exposure time to relate to a duration of time light is to pass through the aperture.

6. The device of claim 5, wherein,
   the calculation module is to further determine the final position based on the selected aperture size, wherein
   the aperture size is to determine the depth of field in front of and behind the final position.

7. The device of claim 6, wherein the calculation module is to select the final position such that the depth of field includes at least the object corresponding to one of the highest focus scores and such that the depth of field is shifted towards an other of the objects corresponding to an other of the highest focus scores, if the depth field can not include the two objects having the highest focus scores.

8. The device of claim 6, wherein the calculation module is to determine the final distance based on a sum of the focus scores within the depth of field at various positions of the lens.

9. The device of claim 4, further comprising:
   an exposure module to determine the exposure threshold based on at least one of a type of medium and sensor to capture the image, wherein
   the focus score is based on at least one of contrast detection, color differential and edge detection of the object.

10. A method for focusing an image, comprising:
    determining focus scores of a plurality of objects viewed through a lens, the focus score of each of the objects to be measured at one of a plurality of initial positions of the lens at which the quality is greatest for the corresponding object;
    correlating each of the initial positions of the lens to one of the measurements;
    selecting a final position of the lens based on the determining and the correlating, wherein the final position is not one of the initial positions and is based on a max number of the focus scores; and
    excluding at least one of the focus scores having a value lower than that of an other of the focus scores, if a number of the focus scores exceeds the max number.

11. The method of claim 10, wherein the selecting selects the final position to be between two of the initial positions corresponding to the highest focus scores.

12. The method of claim 10, wherein,
    the selecting further selects the final position based on a depth of field, the depth of field to be centered around the final position, and
    the depth of field is based on a size of an aperture of the lens.

13. A non-transitory computer-readable storage medium storing instructions that, if executed by a processor of a device, cause the processor to:
    receive image data to determine initial positions of a lens at which each of a plurality of objects of an image has a highest quality;
    assign a focus score to each of the plurality of objects when each of the objects has the highest quality, the focus score to provide a quality measurement;

set a final position of the lens to be between two of the initial position based on a max number of the focus scores; and exclude at least one of the focus scores having a value lower than that of an other of the focus scores, if a number of the focus scores exceeds the max number.

14. The non-transitory computer-readable storage medium of claim 13, further comprising instructions that, if executed by the processor, cause the processor to:

set a size of an aperture of the lens based on an exposure setting, wherein the size of the aperture is to determine a depth of field, and the final position of the lens is further set based on the depth of field.

* * * * *

UNITED STATES PATENT AND TRADEMARK OFFICE
CERTIFICATE OF CORRECTION

| | | |
|---|---|---|
| PATENT NO. | : 8,655,162 B2 | Page 1 of 1 |
| APPLICATION NO. | : 13/435820 | |
| DATED | : February 18, 2014 | |
| INVENTOR(S) | : John Mick et al. | |

It is certified that error appears in the above-identified patent and that said Letters Patent is hereby corrected as shown below:

In the Claims:

In column 7, line 66, in Claim 4, delete "a select" and insert -- select --, therefor.

Signed and Sealed this
Thirtieth Day of September, 2014

Michelle K. Lee
*Deputy Director of the United States Patent and Trademark Office*